United States Patent [19]

Stafford

[11] Patent Number: 5,119,665
[45] Date of Patent: Jun. 9, 1992

[54] INSTALLATION TOOL FOR CAPTIVE PANEL FASTENER

[75] Inventor: Jay M. Stafford, Torrance, Calif.

[73] Assignee: VSI Corporation, Chantilly, Va.

[21] Appl. No.: 648,074

[22] Filed: Jan. 31, 1991

Related U.S. Application Data

[62] Division of Ser. No. 495,510, Mar. 19, 1990, Pat. No. 5,056,208.

[51] Int. Cl.⁵ .............................................. B21D 7/06
[52] U.S. Cl. ....................................... 72/410; 72/416; 81/424.5
[58] Field of Search ............... 72/409, 410, 416; 81/424.5, 418, 426.5; 29/270, 280

[56] References Cited

U.S. PATENT DOCUMENTS

| | | | |
|---|---|---|---|
| 1,199,255 | 9/1916 | Evans | 81/424.5 |
| 2,814,222 | 11/1957 | Sanders | 72/409 |
| 3,203,221 | 8/1965 | Conner | 72/410 |
| 3,680,352 | 8/1972 | Wunder | 72/410 |
| 3,768,138 | 10/1973 | Trapp | 29/270 |
| 4,318,316 | 3/1982 | Guilliams | 81/426.5 |

FOREIGN PATENT DOCUMENTS

| | | | |
|---|---|---|---|
| 1267422 | 6/1961 | France | 72/410 |
| 20004 | 10/1904 | United Kingdom | 72/410 |
| 149396 | 8/1920 | United Kingdom | 81/424.5 |

Primary Examiner—Daniel C. Crane
Attorney, Agent, or Firm—Irving Keschner

[57] ABSTRACT

A tool for installing a retaining ring onto the threaded shank of a bolt to form a captive panel fastener. Alignment tabs formed on the retaining ring are positioned into cutout portions formed in the nose area of the tool. The tool and ring are then engaged onto the bolt from the outer end by first aligning visual markings formed on the tool jaws with longitudinal slots formed on the bolt shank. Force is then applied to the tool to crimp the ring and deform it while forcing tangs on the ring into the slots. The ring is prevented from being removed from the bolt slots while being free to move therealong.

2 Claims, 2 Drawing Sheets

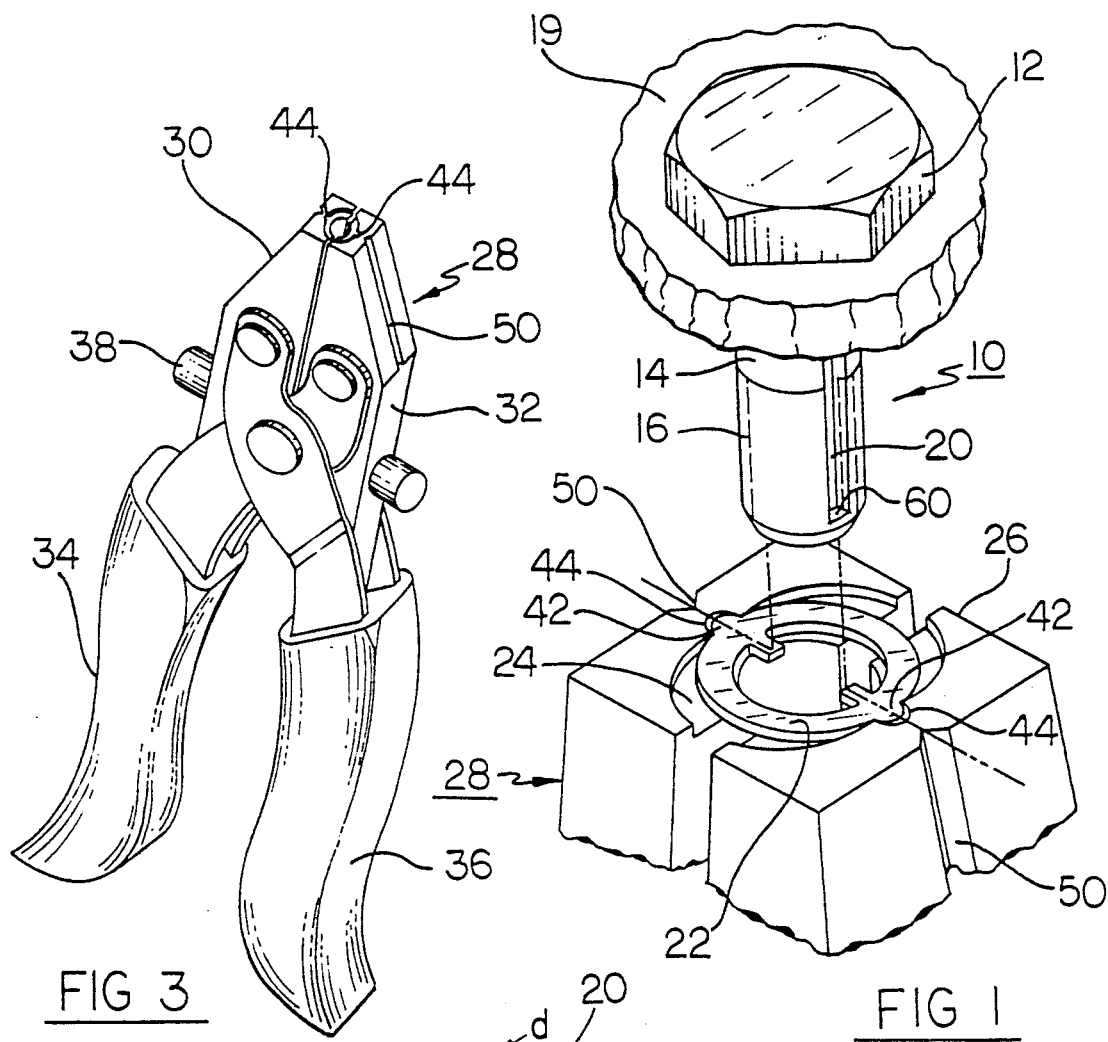
FIG 3
FIG 1
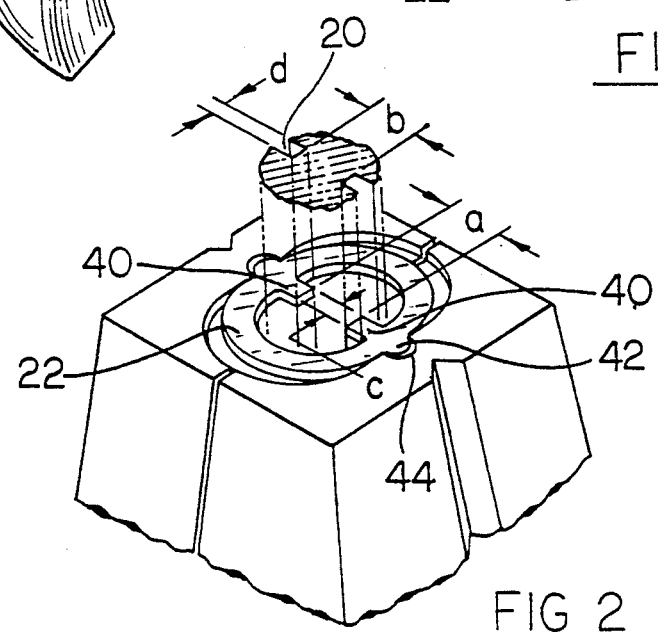
FIG 2

INSTALLATION TOOL FOR CAPTIVE PANEL FASTENER

This is a division of application Ser. No. 495,510, filed Mar. 19, 1990, now U.S. Pat. No. 5,056,208, issued Oct. 15, 1991.

BACKGROUND OF THE INVENTION

1. Field of the Invention

The present invention relates to captive fastener assemblies, and more particularly, to an improved captive fastener assembly suitable for being captivated to panels such as aircraft panels and the like.

2. Description of the Prior Art

Panel fasteners for aircraft cowlings and other aircraft panels are well known in the art. In the customary means of assembly, a stud with an enlarged head is inserted through the opening of the panel and into a nut member attached to the base structure of the aircraft. The stud is then torqued to secure the panel. To prevent the stud from falling out of the panel when removed from the nut and possibly being lost, or falling into a jet engine intake and thereby damaging the engine, the stud is usually coupled with a retaining means which captivates the stud to the panel.

Once such captivated panel fastener is shown in U.S. Pat. No. 3,294,140. As seen in this patent, the stud has an enlarged head and three splines extending intermediate its length. A retaining ring formed with integral tabs is snapped over the unsplined leading end of the stud and the tabs placed in the splines. Once in place, the retaining ring and the enlarged head of the stud function as stops to captivate the stud and prevent it from being displaced from the panel. In this embodiment, the retaining ring must be relatively flexible, and the tolerances between the tabs and the spline must be relatively loose to permit the ring to be snapped over the leading end of the stud.

Because of the flexibility of the retaining ring and the loose tolerances between the splines and the tabs, it has been found that the stud, particularly if cocked at an angle, can become accidentally detached from the retaining ring and thus from the panel. As mentioned above, this has important consequences if the stud were to fall into the jet engine intake and damage the engine.

Other prior art techniques for installing retaining rings with inward facing tabs onto studs (screws) having longitudinal slots to accept the tabs included:

(a) Using a split retaining ring which is open sufficiently to clear a screw nose abutment and then allow to close with the tangs engaging the screw slots. This method of ring installation is prone to assembler error which would cause the ring to take a "set" in the open position resulting in disengagement from the bolt.

(b) Using a bolt having a deformable nose end allowing a solid ring to be slipped onto the bolt with the tabs engaging the slots and then deforming the nose end to create an abutment which prevents the ring from disengaging. This type of design is limited by the narrow selection of deformable bolt materials and requires a somewhat bulky installation tool needing precise adjustments to prevent over-distorting the bolt. U.S. Pat. No. 4,665,658 to Gulistan is an example of this technique. As disclosed in this patent, the threaded end of the fastener, or bolt, has a hole in it so that after the retaining ring, or washer, is applied to the bolt via the slots formed thereon, the outer end thereof is formed by a hand tool and bent outwardly to a slight extent to close the slot end and thus prevent the washer from being removed from the bolt.

(c) Using a solid ring which was pushed or "shoehorned" over the screw nose, deflecting the tabs or stretching the ring until it snapped into engagement with the bolt slots. The disadvantage of this method lies in the small amount of "springback" inherent to solid rings creating a "set" in the ring shape resulting, in many cases, in insufficient slot engagement. The device described in the aforementioned U.S. Pat. No. 3,294,140 is one example of this technique.

(d) Using a knurled, press-fit plug fitted into a hole located in the bolt nose to captivate the retaining ring to the bolt's longitudinal slots. The plug contains a flange abutment which captivates the ring on the bolt.

Other techniques for captivating the bolt on the panel include those disclosed in U.S. Pat. No. 3,394,747 to Duffy wherein the ring is screwed or pushed onto the stud threads and then crimped; U.S. Pat. Nos. 4,723,881 and 4,865,500 to Duran wherein a ring is deformed from its original shape by crimping and captivated to the outside of an internally threaded bolt by means of a secondary, split ring which is installed onto the nose area of the bolt creating an abutment which prevents the primary, solid rings form falling off; U.S. Pat. No. 2,949,143 to Shur wherein the ring is installed into a housing which is mounted into a panel hole, the housing, by means of a second, surrounding ring, captivating the bolt assembly to the panel; and U.S. Pat. No. 2,492,115 to Crowther wherein the ring is threaded or pushed onto the bolt until it passes the bolt threads and grips an unthreaded portion of the bolt shank, the ring internal portion deforming elastically during installation over the bolt threads and then returning to its original shape to grip unthreaded shank.

U.S. Pat. Nos. 3,561,093 and R.27,978 to Gulistan disclose push-pull tools for pulling on a bolt while pushing upwardly on a housing skirt, thereby outwardly flaring the housing which contains the bolt, the outward flaring of the housing skirt onto the base of a panel captivating the bolt assembly to the panel.

In those techniques requiring a separate installation tool to install the ring on the bolt slots, it is difficult to visually align the tool with the bolt slots for the installation, thus increasing the installation time and the labor costs associated therewith.

What is thus desired is to provide a method for providing a captive panel fastener which utilizes a solid ring retainer, the bolt itself not being deformed during the installation process, and tooling which enables the user to rapidly align and install the ring on the bolt.

SUMMARY OF THE PRESENT INVENTION

The present invention sets forth a method for providing a captive panel fastener assembly comprising a bolt, or screw, having head, shank and threaded outer end portions, slots extending longitudinally down through the bolt threads towards the outer end of the bolt and a retaining ring for securing the bolt to a panel.

The metal retaining ring has inwardly facing tangs, or tabs, which are distanced sufficiently to allow the ring to be slipped over the outer end of the bolt and into longitudinally extending slots formed thereon. The ends of the slots terminate in abutments. The inside diameter of the installed ring is sufficiently larger than the outside diameter of the bolt shank, threads and outer end to allow the bolt to travel freely through the ring. The outer surface of the ring is provided with outwardly extending alignment tabs opposite the corresponding tangs.

Installation of the retaining ring onto the bolt is accomplished by first placing the alignment tabs into cut-out portions formed in the nose area of a tool. The tool and ring are then engaged onto the bolt from the outer end by first aligning visual markings formed on the tool jaws with the slots. Force is then applied to the tool to crimp the ring and deform it to an oval shape while forcing the ring tangs into the slots. The distance between the ring tangs, upon crimping, is smaller than the diameter of the slot-end abutments thereby preventing removal of the ring from the bolt slots. In addition, the distance between the ring tangs, upon crimping, is greater than the distance between the slot faces, and the width of the ring tangs is narrower than the width of the slots, thus enabling the ring to travel freely along the slot length. The ring retains the deformed oval shape after the installation.

The initial ring shape may be oval, the crimping process causing the ring to take a substantially round shape after installation. The ring alignment tab and the corresponding receiving component in the tool jaws can take various shapes, such as notches, flats, etc.

The present invention thus provides a relatively simple and inexpensive technique for retaining a fastener to a panel by installing a solid retaining ring onto the threaded bolt without the necessity of deforming the bolt material. Since the bolt is not deformed, should ring failure occur, the bolt may be reused by installing a new ring. In addition, selection of bolt materials, heat treatments and finishes are not limited to only deformable materials. The use of cooperating alignment features on the ring and in the tool jaws and the visual markings on the outside surfaces of the tool jaws enables the installation to be accomplished rapidly and accurately.

BRIEF DESCRIPTION OF THE DRAWING

For a better understanding of the invention as well as other objects and further features thereof, reference is made to the following description which is to be read in conjunction with the accompanying drawing wherein:

FIG. 1 is a perspective view illustrating the retaining ring positioned in a tool prior to installation onto a bolt;

FIG. 2 is a perspective view illustrating the retaining ring installed on a bolt;

FIG. 3 is a perspective view of an installation tool utilized in the present invention;

DETAILED DESCRIPTION OF INVENTION

Figure 4:
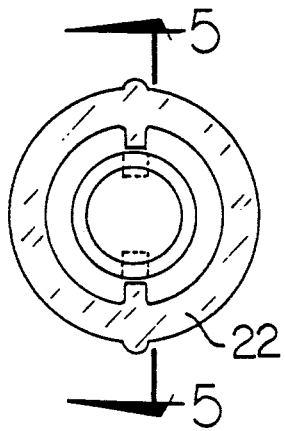
FIG. 4 is an end view showing the retaining ring during the initial stages of the installation.

Referring now to the drawings, a perspective view illustrating the initial steps of forming the captive panel fastener assembly of the present invention is illustrated. In particular, a bolt (also known in the art as a stud or screw) 10, comprises a head 12, a smooth shank portion 14 adjacent head 12 and a threaded portion 16 leading from the shank portion to the forward end of the bolt 10. The bolt 10 is shown extending through panel member 19.

Extending substantially along the length of the bolt beginning adjacent the head at one end of the bolt and terminating adjacent the forward end of thereof are two slots, or splines, 20 (only one shown in FIG. 1), the slots 20 being spaced equidistant (180°) from each other about the periphery of bolt 10.

A solid retaining ring 22 is shown positioned in an oval depression 24 formed in the front end, or nose, 26 of installation tool 28. As shown more clearly in FIG. 3, tool 28 comprises jaws 30 and 32, gripping handles 34 and 36 and jaw locking button 38. Retaining ring 22 is provided with inwardly extending tangs, or tabs 40, for engagement with splines 20 of the bolt 10. Directly opposite tangs 40 and extending outwardly are rounded tab portions 42 positioned to fit into alignment notches 44 formed in the tool nose in depression 24. As shown in FIG. 1, retaining ring 22 in its initial round shape, is inserted into the oval depression 24 when the jaws 30 and 32 are slightly open. The dimensions of slots 20 and the tangs 40 are such that when the tangs are operatively engaged with the slots (FIG. 8), there is minimal sliding clearance between the members enabling the retaining ring to be maintained substantially perpendicular to the axis of the bolt. A pair of notches 50 are formed in tool jaws 30 and 32 in alignment with tabs 44 to enable the installer to properly align the tool nose, and thus retaining ring 22, with slots 20. To enhance the alignment process, the notches preferably are filled with a visibility enhancing material, instead of notches 50 such as yellow marking material. Alternatively, a visible marking material could be directly applied to the tool jaws.

FIG. 2 is a perspective view illustrating tool 28 placed on stud 10, tangs 40 in slots 20 and the tool jaws 30 and 32 closed upon each other in a manner such that the circularly shaped retaining ring shown in FIG. 1 has changed to an essentially oval shape. Due to the "set" characteristics of the retaining ring material (a material which can be utilized is 17-7 precipitation hardening corrosion resistant steel), the ring retains the oval shape after the tool is removed from bolt 10.

Figure 5:
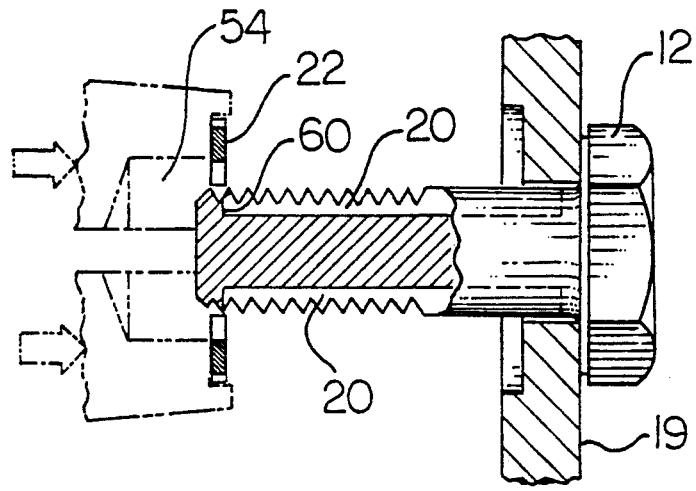
FIG. 5 is a sectional view along line 5—5 of FIG. 4.
Figure 6:
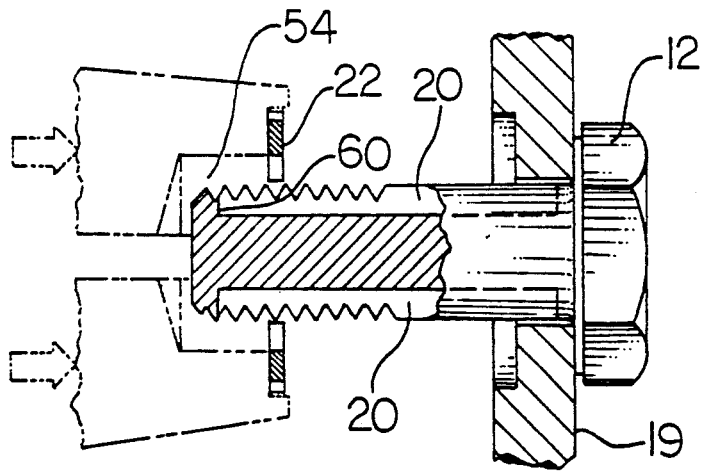
FIG. 6 is a sectional view showing the retaining ring during the intermediate stage of the installation.
Figure 7:
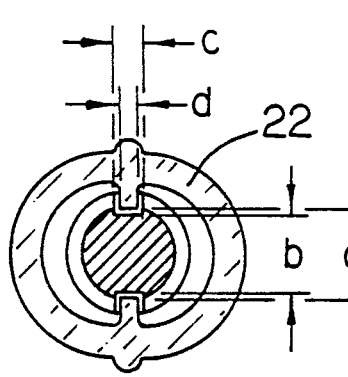
FIG. 7 is an end view showing the retaining ring after the installation.
Figure 8:
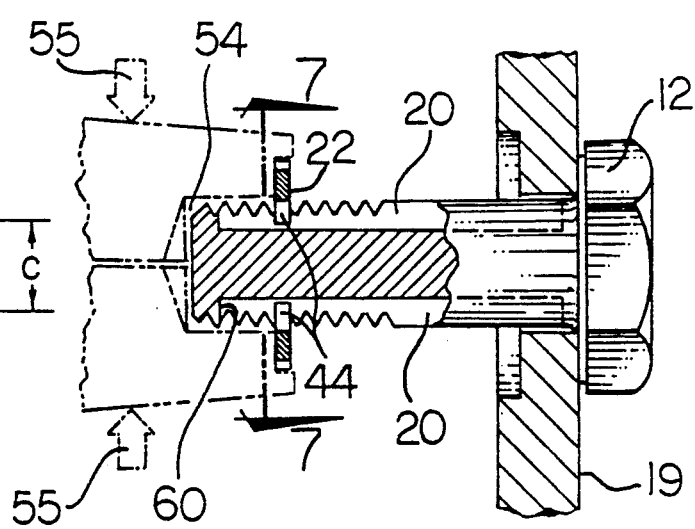
FIG. 8 is a sectional view along line 8—8 of FIG. 7.

FIGS. 4 and 5 illustrate the installation at the moment when the tool nose is initially placed on bolt 10, the internal diameter of the retaining ring 22 and the inwardly extending height of tangs 40 being such that the retaining ring clears the front end of bolt 10. As shown in FIG. 6, the tool is placed onto the bolt to a depth determined by the depth of tool jaw relief hole 54. FIGS. 7 and 8 illustrate the installation procedure after the tool jaws have been forced together as indicated by arrows 55 by the user squeezing handles 34 and 36 together. At this time, retaining ring 22 is crimped, such that it takes an oval shape, while forcing tangs 40 into slots 20 to a depth such that the tangs 40 are permanently maintained in the slots 20 by abutments 60 formed at the ends of slots 20 (the abutments are shown perpendicular to the longitudinal axis of bolt 10). The distance between the ring tangs 40, upon crimping, is smaller than the diameter of the slot end abutments thereby preventing removal of the ring from the bolt slots. Since the distance a between the ring tabs, upon crimping, is greater than the distance between the slot faces b (FIG. 2) and the width c of the ring tabs is narrower than the width d of the slots, the retaining ring 22 is free to travel along the slot length.

It should be noted that other variations of the assembly shown in the figures can be utilized and still be encompassed by the teachings of the present invention. For example, retaining ring 22 could be crimped from an original oval shape ring into a substantially circularly (or round) shaped ring during installation. In addition, flats can be utilized on the tool jaws instead of the notches shown. Further, the outwardly extending tabs 42 could be replaced by inwardly shaped notches which then would engage correspondingly shaped notch protrusions formed in the tool nose recess.

The installation procedure is as follows.

Bolt 10 is first inserted through an aperture formed in panel 19. Retaining ring 22 is placed in the oval depression 24 formed in tool nose 26 (the tool jaws are slightly open to accept the retaining ring) in a manner such that alignment tabs 42 are positioned in corresponding tool nose cutouts, or notches, 44. The installation tool is positioned onto bolt 10 with the yellow markings on the tool jaws aligned with the bolt slots 20. The bolt nose protrudes into the tool jaw relief hole 54 so that the retaining ring tangs 40 clear the bolt nose. The handles of the tool are then squeezed firmly to crimp (deform) the retaining ring 22, the tool then being opened and removed from bolt 10. The installation is complete with the retaining ring 22 now substantially oval in shape and with the tangs 40 engaged in slots 20 and unable to clear abutments 60.

The present invention thus provides a captive panel fastener assembly wherein the installation of the solid retaining ring does not require deformation of the receiving bolt, thus providing an assembly wherein retention capability is enhanced and wherein installation is accomplished rapidly and simply by using a double alignment arrangement, the retaining ring first being accurately aligned in the tool nose and the tool jaws having visible alignment markings so that the installer can align the tool (and thus the retaining ring) with the bolt slots.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A tool for installing a solid retaining ring having tab members on slots formed on a fastener for providing a captive panel fastener in place, said retaining ring having inner and outer diameters and surfaces extending therebetween, comprising:

first and second movable jaw members, each jaw member having a nose portion with a depression formed therein for supporting one of said surfaces, each depression being shaped such that when the jaw members are in a first position, said retaining ring can be positioned within a depression formed by the depressions in the nose portions of said first and second jaw members, said retaining ring having a first shape, said retaining ring being deformed to a second shape when said jaw members are moved to said second position, the deformation of said retaining ring caused by the movement of said jaw members being limited such that said retaining ring can fully move along said fastener slots; and first and second gripping members connected to said first and second jaw members whereby said jaw members can be moved between said first position and said second position, said depression in each nose portion of the jaw including alignment cutouts for engaging each tab member of the retaining ring, said jaws being in a substantially closed position in said second position and said jaws further being shaped to receive a fastener while said jaws are in said second position and said retaining ring is deformed into said second shape.

2. The tool of claim 1 further including marks formed on the side of said first and second jaw members, said marks being in alignment with the corresponding cutouts formed in the nose portions of said first and second jaw members whereby the retaining ring can be visually aligned with the slots formed on said fastener.

* * * * *